3,272,832
NICOTINIC ACID DERIVATIVES AND PROCESS FOR THE PREPARATION THEREOF

Hiroshi Nakano, Toyonaka, Akira Morimoto, Matsubara, Hideyuki Yoshimitsu, Kyoto, and Akira Kimata, Kyoto Prefecture, Japan, assignors to Fujisawa Pharmaceutical Co., Ltd., Doshomachi, Osaka, Japan, a company of Japan
No Drawing. Filed June 24, 1964, Ser. No. 377,483
Claims priority, application Japan, July 3, 1963, 38/34,982
9 Claims. (Cl. 260—295.5)

This invention relates to new and useful improvements in nicotinic acid derivatives and to a process for the preparation thereof and more particularly to 3-carboxy-2-methyl-5-(1,2,3,4-tetrahydroxybutyl) furan (or pyrrole) tetranicotinate and its carboxylic derivatives at 3 position.

Nicotinic acid is known to possess an antipellagra action as a vitamin. It also is effective to dilate the peripheral vascular bed, to lower cholesterol blood levels and to enhance fibrinolytic activity, and accordingly has been used for the treatment of diseases due to disturbances of peripheral circulation, arteriosclerosis.

However, these conditions have tended to become chronic, requiring long-term therapy with nicotinic acid. In addition, the action of nicotinic acid is only transient, and frequently causes such side effects as facial flush, formication (skin irritation).

It has also been recognized that 2-methyl-5-(1,2,3,4-tetrahydroxybutyl)-furan-3-carboxylic acid or its ethyl ester will lower cholesterol levels and control hyperlipemia.

It is an object of this invention to provide agents effective for the treatment of diseases due to disorders of peripheral circulation, arteriosclerosis.

It is another object to provide agents without the undesirable effects of nicotinic acid.

It is a further object to provide such an agent by combining nicotinic acid with tetrahydroxybutyl furans or pyrroles having carboxylic derivatives at 3 position.

The compounds of this invention may be prepared by reacting 2-methyl-5-(1,2,3,4-tetrahydroxybutyl) furan (or pyrrole)-3-carboxylic acid or its carboxylic derivatives with nicotinic acid or its reactive derivatives, i.e. a compound capable of producing the nicotinic acid radical as follows:

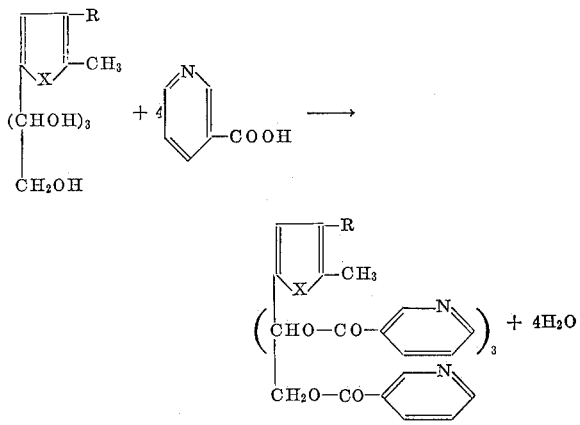

wherein R is a carboxyl or radical that hydrolyzes to carboxyl such as alkoxycarbonyl carbamoyl, or carboxyl metal salt and X is oxygen or an imino radical (—NH—).

2-methyl-5-(1,2,3,4-tetrahydroxybutyl) furan (or pyrrole)-3-carboxylic acid or its carboxylic derivatives, a starting material used in this invention, may be obtained by the following illustrated method: alkyl ester of 2-methyl-5-(D-arabo-1,2,3,4-tetrahydroxybutyl) furan (or pyrrole)-3-carboxylic acid is prepared by reacting D-glucose (or D-glucosamine) with alkyl acetoacetate, and the alkyl ester thus obtained may be converted to the corresponding free acid by hydrolysis. The corresponding steric isomers may be prepared by using aldohexose or amino sugar having the steric configuration corresponding to D-glucose or D-glucosamine, such as D-galactose, D-gulose, D-mannose, D-altrose, D-allose, D-chondrosamine, etc.

In the reactive derivatives of nicotinic acid to be preferably used in this invention are mentioned the compounds which can be used for acylating the hydroxy radicals of the other reactant, such as nicotinoyl halide, nicotinic anhydride or a mixed anhydride of nicotinic acid with various kinds of organic or inorganic acids. When using an acid halide or an acid anhydride as the reactive derivatives of nicotinic acid, the reaction may be preferably carried out in the presence of a base such as alkali metal carbonate, alkali metal bicarbonate, trimethylamine, pyridine, dimethylaniline, etc. When using the free acid, it is advantageous to carry out the reaction in the presence of a condensing agent such as boron fluoride, N,N'-carbonyldiimidazole, N,N'-carbonyl di-(2-methyl) imidazole, p-toluene sulfonic acid, etc.

The reaction is usually carried out with a solvent, a few examples being aromatic hydrocarbons such as benzene, toluene, xylene, etc., or inert solvents such as dioxane. When using the aforementioned base in liquid, this can also be the solvent. A suitable solvent may be selected with due consideration of the reacting conditions including the desired reaction temperature. The reaction may be carried out under various temperatures and is not particularly limited. In case of using nicotinoyl halide and metal salt of 2-methyl-5-(1,2,3,4-tetrahydroxybutyl) furan (or pyrrole) 3-carboxylic acid as starting materials to be reacted, a mixed anhydride of nicotinic acid with a carboxyl radical of the said furan (or pyrrole) 3-carboxylic acid may be produced. Also, when 3-carboxy-2-methyl-5-(1,2,3,4-tetrahydroxybutyl) furan (or pyrrole) tetranicotinate is obtained, it may be converted to its metal salt by reaction with metal compounds such as alkali metal hydroxide, alkali metal carbonate or alkali metal alcoholate and alkali earthmetal hydroxide or alkali earthmetal carbonate, by the conventional method.

The object compounds of this invention so obtained are useful in the treatment of diseases due to disturbances of peripheral circulation and arteriosclerosis, and are superior to nicotinic acid in its absorbability and long lasting activity as well as in lesser manifestation of side effects.

For example, 3-methoxycarbonyl-2-methyl-5-(D-arabo-1,2,3,4-tetrahydroxybutyl) furan tetranicotinate in a dose of 400 mg. was orally given 3 times daily to 60 patients affected with Raynaud's disease, Burger's disease, chilblains, and cold sensations in the limbs. There was both subjective and objective improvements in almost all the patients.

Nicotinic acid, given orally in a dose of more than 80 mg., caused facial flush and formication in many patients, whereas the above substance given in a dose up to 500 mg., caused scarcely any such side effects.

The substance was given orally to mice of d,d- strain in doses of 1.2 and 3 g. per kg. body weight without any abnormal changes being noted in any cases. The substance was given orally in doses of 0.5 and 1 g. per kg. body weight for 3 consecutive months to rats of the Wistar strain without any abnormal changes being noted either pathologically or histologically.

Plethysmographic observations have proven the substance to exhibit more sustained vasodilating action than nicotinic acid.

Further, 500 mg. of nicotinic acid and an equimolecular amount of the substance were respectively given to human subject orally, and the urinary excretions of nicotinic acid and of its metabolic products, i.e., N-methyl-3-carbamoyl-6-pyridone, determined. The nicotinic acid was mostly excreted intact in a short while, whereas the substance was excreted in its original form in lesser amounts, and was excreted during a prolonged period of time in the form of the mentioned metabolic products.

This invention includes within its scope therapeutically useful compositions which comprise one or more of the compounds of this invention together with a significant amount of a non-toxic liquid, solid or paste carrier. In clinical practice the compositions suitable for oral administration are preferable at a single dosage of 200–800 mg. given 3 times daily.

Solid compositions for oral administration include tablets, pills, dispersible powder and granules. In such solid compositions one or more of the active compounds is admixed with one inert diluent such as potato starch, lactose, calcium carbonate and further additional substances, e.g. lubricating. Liquid compositions for oral administration include pharmaceutically acceptable solutions, suspensions, etc. containing inert diluents commonly used in the art. The compositions for oral administration also include capsules of absorbable material such as gelatin containing one or more of the active compounds with or without the addition of diluents or excipients.

The following examples are given solely for the purpose of illustration only and are not to be construed as limitations of this invention, as many apparent variations are possible without departing from the spirit or scope thereof.

*Example 1*

4 g. of nicotinoyl chloride prepared from nicotinic acid and thionyl chloride is suspended into 15 cc. of pyridine. To this solution is added 0.79 g. of ethyl ester of 2-methyl-5-(D-arabo-1,2,3,4-tetrahydroxybutyl) furan-3-carboxylic acid (prepared from D-glucose and ethyl acetoacetate) in 10 cc. of pyridine and refluxed for an hour with protection from moisture. This stood overnight, after which the precipitate is filtered, washed with 100 cc. of benzene and discarded. The filtrate and washings are joined, washed 3 times with 10% aqueous sodium carbonate solution, washed with water, and then dried. The solvent is distilled off under reduced pressure, and the residue is dissolved in 50 cc. of ether under warming. The ether solution is allowed to stand, and 1.9 g. of 3-ethoxycarbonyl-2 - methyl - 5 - (D - arabo - 1,2,3,4 - tetrahydroxybutyl) furan tetranicotinate precipitates as refined crystals. These crystals are recrystallized from a mixture of ethanol and ether to obtain crystals having M.P. 127–128° C.

*Analysis.*—($C_{36}H_{30}O_{11}N_4$) Calculated: C, 62.34; H, 4.35; N, 8.07. Found: C, 62.27; H, 4.63; N, 7.85.
Ultra-violet absorption spectrum $\lambda_{max.}^{95\% \text{ ethanol}}$ 258 m$\mu$ ($\epsilon$ 13430), 263.5 m$\mu$ ($\epsilon$ 13390)

*Example 2*

A mixture of 1.02 g. of ethyl ester of 2-methyl-5-(D-arabo-1,2,3,4-tetrahydroxybutyl) furan-3-carboxylic acid and 4.8 g. of nicotinic anhydride is dissolved in 6 cc. of anhydrous pyridine with protection from moisture and then heated on a water bath for 4 hours. After allowing to stand overnight, the precipitate is filtered, washed with 60 cc. of ether, and discarded. The filtrate and washings are poured into a mixture of 6 cc. of 10% aqueous sodium carbonate solution and 50 cc. of water. The precipitated mud-like material is extracted 3 times with 100 cc. of chloroform and washed with water. After drying, the solvent is distilled off under reduced pressure to obtain a brown gummy substance. This substance is extracted with 200 cc. of ether under warming and after filtration, the filtrate is allowed to cool, from which 1.81 g. of 3-ethoxycarbonyl-2-methyl-5-(D-arabo-1,2,3,4-tetrahydroxybutyl) furan tetranicotinate is precipitated as white granules having M.P. 126–127° C. Furthermore, 0.44 g. of the said product is recovered from the mother liquor, which shows no depression of melting point on admixture with the product of Example 1.

*Example 3*

27 g. of nicotinic acid and 27 g. of thionyl chloride in 100 cc. of toluene are refluxed for 3 hours with protection from moisture to prepare a solution of nicotinoyl chloride. To this solution is added dropwise a suspension of 13 g. of ethyl ester of 2-methyl-5-(D-arabo-1,2,3,4-tetrahydroxybutyl) furan-3-carboxylic acid (prepared from D-glucose and methyl acetoacetate) in 45 cc. of pyridine. This solution is heated for an hour under reflux and allowed to stand overnight. 200 cc. of benzene is then added to the reaction solution, followed by washing 3 times with 40 cc. of 10% sodium carbonate aqueous solution, and then dried after washing with water. The solvent is distilled off under reduced pressure. To the orange-yellow gummy residue is added 30 cc. of ether. This solution is allowed to stand in an ice-box to obtain 25.4 g. of 3-methoxycarbonyl-2-methyl-5-(D-arabo-1,2,3,4-tetrahydroxybutyl) furan tetranicotinate having M.P. 117.5–120° C. This substance is recrystallized from a mixture of methanol and ether to obtain crystals having M.P. 122–124° C.

*Analysis.*—($C_{35}H_{28}O_{11}N_4$). Calculated: C, 61.76; H, 4.15; N, 8.23. Found: C, 61.72; H, 4.25; N, 8.15.
Ultra-violet absorption spectrum $\lambda_{max.}^{95\% \text{ ethanol}}$ 258.5 m$\mu$ ($\epsilon$ 13600), 233.5 m$\mu$ ($\epsilon$ 13602)

*Example 4*

27 g. of nicotinic acid and 27 g. of thionyl chloride in 100 cc. of toluene and 1.7 cc. of dimethylformamide are refluxed for 3 hours with protection from moisture to prepare a solution of nicotinoyl chloride. To this solution is added dropwise a suspension of 13 g. of methyl ester of 2-methyl-5-(D-arabo-1,2,3,4-tetrahydroxybutyl) furan-3-carboxylic acid in 42 cc. of pyridine. Immediately, the reaction proceeds exothermically, and the reaction mixture is refluxed for an hour under stirring. After allowing to stand overnight, the reaction solution is washed with benzene, with 10% aqueous sodium carbonate solution, with water, and then dried. To this solution is added 4.5 g. of active carbon, boiled for a short time and then filtered under warming. The solvent is distilled off under reduced pressure, and as soon as the residue becomes a yellow viscous solution, 15 cc. of absolute methanol is added to the residue for dissolution. To this methanol solution is added 40 cc. of ether and the solution is allowed to stand. 32.5 g. of 3-methoxycarbonyl - 2 - methyl - 5 - (D-arabo-1,2,3,4-tetrahydroxybutyl) furan tetranicotinate is obtained as white or slight yellow crystals having M.P. 120–124° C. This substance is recrystallized from a mixture of methanol and ether to obtain crystals having M.P. 122.5–124° C. which show no depression of melting point on admixture with the product of Example 3.

*Example 5*

A solution of 1.0 g. of 2-methyl-5-(D-arabo-1,2,3,4-tetrahydroxybutyl) furan-3-carboxylic acid and 4.95 g. of nicotinic anhydride in 8 cc. of pyridine are heated for 4 hours on a water bath with protection from moisture. After allowing to stand overnight, the precipitate is filtered, then washed with a small amount of methanol and discarded. The filtrate and washings are joined and evaporated under reduced pressure. The residue is dissolved in a small amount of methanol under warming and then allowed to stand. The precipitate is filtered off, the filtrate treated in the same way as Example 4 and then hexane added to the residue obtained by evaporating under reduced pressure. 2.0 g. of 3-carboxy-2-methyl-5-(D-arabo-1,2,3,4-tetrahydroxybutyl) furan tetranicotinate is obtained as faint yellow fine powders having M.P. 160° C. and softening P. 80° C.

*Analysis.*—($C_{34}H_{26}O_{11}N_4$). Calculated: C, 61.26; H, 3.94; N, 8.41. Found: C, 60.95; H, 4.32; N, 8.67.
Ultra-violet absorption spectrum $\lambda_{max.}^{95\% \text{ ethanol}}$ 257.0 m$\mu$ ($\epsilon$ 12825), 263.3 m$\mu$ ($\epsilon$ 12960)

Example 6

A 5.5 g. solution of nicotinic anhydride in 15 cc. of hot pyridine was prepared with protection from moisture. The reaction mixture is allowed to cool at 18° C. and then added to 1 g. of ethyl ester of 2-methyl-5-(D-arabo-1,2,3,4-tetrahydroxybutyl) pyrrole-3-carboxylic acid (prepared from D-glucosamine and ethyl acetoacetate) in 10 cc. of pyridine. The reaction is carried out under stirring for 6 hours at room temperature. After allowing to stand overnight, the reaction mixture is filtered, the residue washed twice with 30 cc. of chloroform and discarded. To the filtrate and washings is added 50 cc. of chloroform and washed with 10% aqueous sodium carbonate solution and then with water. After drying, the solvent is distilled off to obtain 3.4 g. of reddish brown gummy substance, which is then dissolved in methanol and treated with active carbon. To this solution is added ether and cooled to obtain 3-ethoxy-carbonyl-2-methyl-5-(D-arabo-1,2,3,4-tetrahydroxybutyl) pyrrole tetranicotinate as slight yellow powders having M.P. 167–174° C. (decomp.) and softening P. 37–43° C. This substance becomes soft gum at room temperature.

*Analysis.*—($C_{36}H_{31}O_{10}N_5$). Calculated: C, 62.24; H, 4.64; N, 10.08. Found: C, 62.54; H, 5.61; N, 10.27.
Ultra-violet absorption spectrum $\lambda_{max.}^{methanol}$ 258.2 m$\mu$ ($\epsilon$ 16380), 263.6 m$\mu$ ($\epsilon$ 16950), 270 m$\mu$ ($\epsilon$ 13130)

Example 7

A mixture of 2.5 g. of nicotinic acid and 2.5 g. of thionyl chloride in 15 cc. of toluene and 0.8 cc. of dimethylformamide are refluxed for 3 hours with protection from moisture to prepare a solution of nicotinoyl chloride. This solution is allowed to cool at 18° C. and then added to 1 g. of ethyl ester of 2-methyl-5-(D-arabo-1,2,3,4,-tetrahydroxybutyl) pyrrole-3-carboxylic acid in 15 cc. of pyridine with protection from moisture. The reaction is carried out while keeping the temperature below 20° C. with stirring for 4 hours. After allowing to stand overnight, the reaction mixture is filtered under suction, the residue washed with 50 cc. of chloroform and discarded. To the filtrate and washings is added 50 cc. of chloroform, which is then washed with water, twice with 20 cc. of 5% aqueous sodium carbonate solution and finally 4 times with 30 cc. of water. After drying, the solvent is distilled off under reduced pressure to obtain crude product as a brown-yellow gummy residue. This product is dissolved in 80 cc. of a mixture of chloroform and methanol (10:3), treated with active carbon and the solvent removed. By recrystallization from a mixture of chloroform and ether, a brown-yellow powder is obtained having M.P. (decomp.) 167–175° C. and softening point 37° C.
Ultra-violet absorption spectrum $\lambda_{max.}^{methanol}$ 258.2 m$\mu$ ($\epsilon$ 16635), 263.6 m$\mu$ ($\epsilon$ 17080), 270 m$\mu$ ($\epsilon$ 13390)

We claim:
1. A compound having the formula

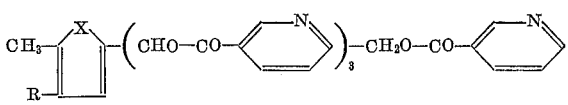

wherein X is oxygen or an imino radical, and R is a carboxyl, acid salt thereof, alkoxycarbonyl or carbamoyl, radical.

2. 3 - carboxy - 2 - methyl - 5 - (D - arabo - 1,2,3,4-tetrahydroxybutyl) furan tetranicotinate.

3. 3 - methoxycarbonyl - 2 - methyl - 5 - (D - arabo-1,2,3,4 - tetrahydroxybutyl) furan tetranicotinate.

4. 3 - ethoxycarbonyl - 2 - methyl - 5 - (D - arabo-1,2,3,4-tetrahydroxybutyl) furan tetranicotinate.

5. 3 - ethoxycarbonyl - 2 - methyl - 5 - (D - arabo - 1,2,3,4-tetrahydroxybutyl) pyrrole tetranicotinate.

6. A process for the preparation of a compound (I) having the formula

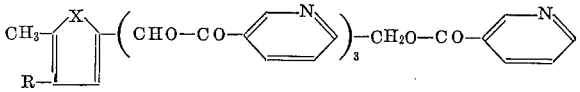

comprising reacting a compound (II) having the formula

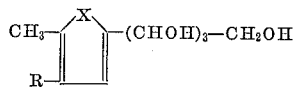

with a compound (III) capable of producing a nicotinic acid radical wherein X is oxygen or an imino radical, and R is a carboxyl, acid salt thereof, alkoxycarbonyl or carbamoyl, radical.

7. A process for the preparation of a compound (I) having the formula

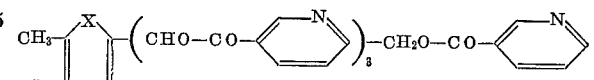

comprising reacting a compound (II) having the formula

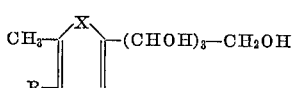

with a nicotinic acid compound selected from the group consisting of nicotinic acid, nicotinoyl halide, nicotinic anhydride, a mixed anhydride of nicotinic acid and an inorganic acid, wherein X is oxygen or an imino radical, and R is a carboxyl, acid salt thereof, alkoxycarbonyl or carbamoyl, radical.

8. The process of claim 7 wherein said nicotinic acid compound is nicotinoyl halide and is reacted in the presence of a base selected from the group consisting of alkali metal carbonate, alkali metal bicarbonate, trimethylamine, pyridine and dimethyl aniline.

9. A process according to claim 7 wherein said nicotinic acid compound is nicotinic anhydride and is reacted in the presence of a base selected from the group consisting of alkali metal carbonate, alkali metal bicarbonate, trimethylamine, pyridine and dimethyl aniline.

References Cited by the Examiner
UNITED STATES PATENTS

| | | | |
|---|---|---|---|
| 3,166,562 | 1/1965 | Leditschke | 260—295.5 |
| 3,178,432 | 4/1965 | Riehen | 167—65 |
| 3,184,383 | 5/1965 | Hupin | 167—65 |
| 3,185,697 | 5/1965 | Laakso | 260—295.5 |

WALTER A. MODANCE, *Primary Examiner.*

JOHN. D. RANDOLPH, *Examiner.*

ALAN L. ROTMAN, *Assistant Examiner.*